United States Patent [19]
Weber

[11] 3,913,422
[45] Oct. 21, 1975

[54] SCISSORS MADE OF STEEL STAMPINGS

[75] Inventor: Dietrich Weber, Solingen, Germany

[73] Assignee: Krusius Brothers, Solingen, Germany

[22] Filed: July 17, 1974

[21] Appl. No.: 489,427

Related U.S. Application Data

[63] Continuation of Ser. No. 290,228, Sept. 18, 1972, abandoned.

[30] Foreign Application Priority Data

Oct. 4, 1971 Germany.............................. 2149429

[52] U.S. Cl............................................. 76/104 A
[51] Int. Cl.².......................................... B21K 11/06
[58] Field of Search ............. 30/254, 256, 257, 258, 30/341; 128/318, 321; 76/104 A

[56] References Cited

UNITED STATES PATENTS

| | | | |
|---|---|---|---|
| 180,408 | 8/1876 | Adair | 76/104 A |
| 590,330 | 9/1897 | Nolen | 30/254 |
| 1,990,694 | 2/1935 | Jacobs | 76/104 A |
| 2,669,992 | 2/1954 | Curutchet | 128/321 |
| 3,717,921 | 2/1973 | Ygfors | 30/341 X |
| D198,963 | 8/1964 | Ericson | 30/254 X |

Primary Examiner—Al Lawrence Smith
Assistant Examiner—J. C. Peters
Attorney, Agent, or Firm—Silverman & Cass, Ltd.

[57] ABSTRACT

Shears made of cut parts of a steel sheet, the upper and lower portions being integrally structured and each having a cutting blade, a shank and a finger hole.

11 Claims, 4 Drawing Figures

U.S. Patent   Oct. 21, 1975   3,913,422
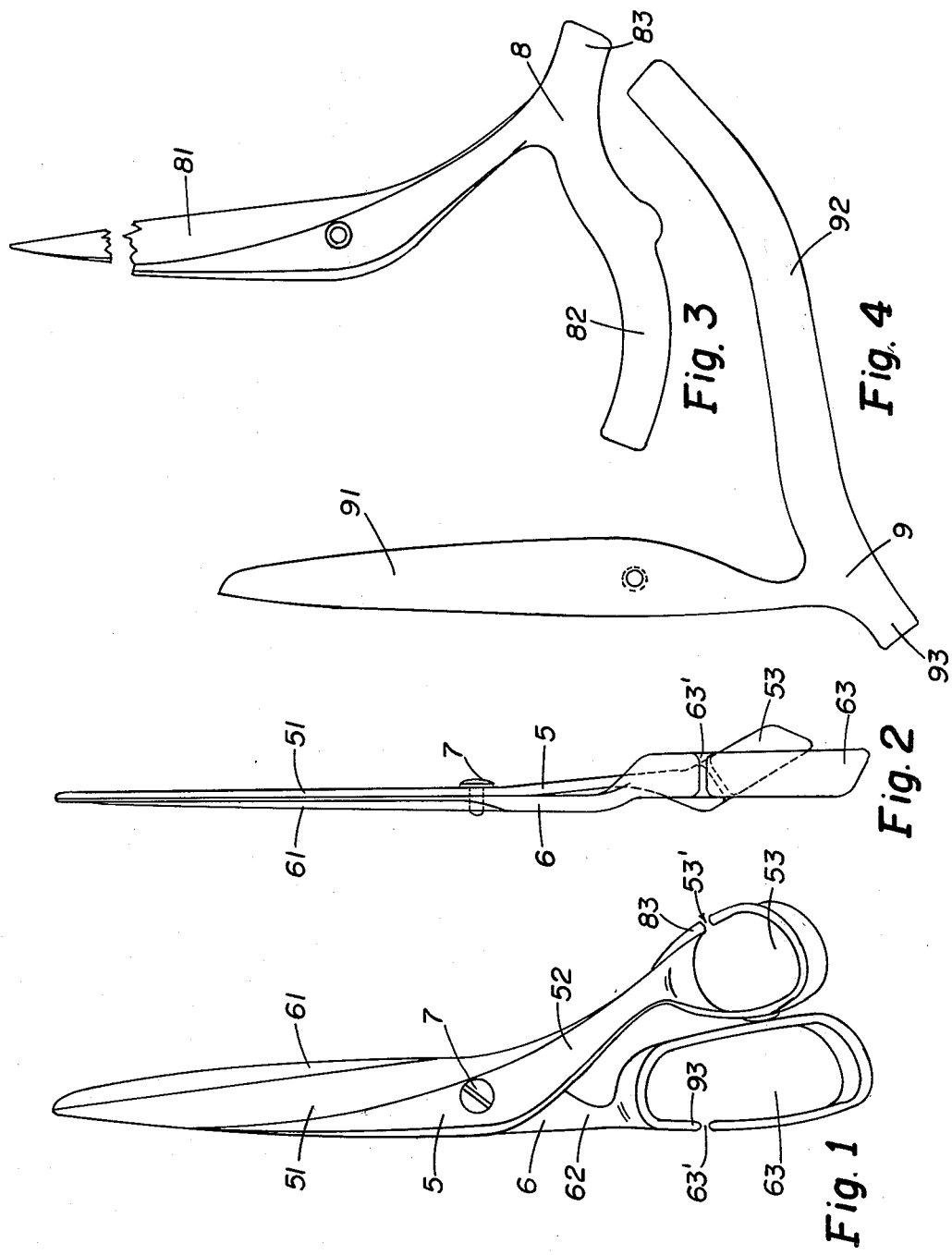

SCISSORS MADE OF STEEL STAMPINGS

This is a continuation of application Ser. No. 290,228 filed Sept. 18, 1972, now abandoned.

BACKGROUND OF THE INVENTION

The invention relates to shears.

Shears may be formed from cut steel sheet, finger holes being formed by punching out apertures. This mode of manufacture may show disadvantages, insofar as sharp burrs formed at the aperture edges during the punching process may have to be removed by internal grinding, which may require considerable effort and be expensive.

DESCRIPTION OF THE PRIOR ART

In other shears formed from cut steel sheet, the finger holes are moulded on from plastics material subsequently. In consequence of the low strength of the plastic material, the finger holes are constructed to be very sturdy and plump, thus causing the pleasing appearance of the shears to suffer.

According to the invention there are provided shears formed of cut steel sheet, the upper and lower shear of which each are integrally constructed and each comprise a cutting edge, a stem and a finger hole, wherein the upper and the lower shear each consist of a stamped part, which has a main limb forming the cutting edge and at least one side limb bent into a ring-shaped finger hole.

The stamped part may possess a V-, L- or T-shaped outline. A substantial simplification in the production of the shears may be achieved, since the fine working of the surfaces of the halves of the shears, in particular of the limbs forming the finger holes, may take place before the bending of those limbs.

The ring periphery of the finger holes may be interrupted by a split. In the use of the shears, this split may be arranged so as not to cause difficulty but to simplify and to cheapen the manufacture of the shears. The limb or limbs of the stamping piece intended in each case for the formation of the finger holes thus merely need to be bent over by means of suitable devices, without any further re-working. Nevertheless, it is possible to connect with one another the two open ends of the finger hole rim forming the split, by means of welding, soldering, sticking, reveting or the like, if desired.

The walls of the finger holes may be orientated to be perpendicular or inclined to the plane of the cutting edges, so that the fingers of the operating hand meet a relatively large and comfortable contact surface.

The finger holes, seen in side elevation of the shears, may possess a parallelogram-like outline, which is orientated to the left for one hole and to the right for the other hole. It may further be provided that one finger hole possesses a longitudinal extension orientated in the longitudinal direction of the cutting edges, while the other finger hole is approximately circular, and that the circular finger hole intended for the holding of the thumb is set sloping in longitudinal direction of the shears and forms an obtuse angle with the associated cutting edge. Shears may thus be produced, the finger holes of which are well adapted to the anatomical character of the human operating hand. Furthermore, a characteristic appearance furthering the aesthetic impression and thus constituting an attraction to a purchaser may be obtained.

The halves of the shears may consist of stainless steel sheet. To cheapen the production further, cold-rolled, i.e. bright steel sheet may be employed. Descaling of the normally black sheet surface may thus become superfluous, so that only the edges of the still unbent stamping pieces need to be freed from stamping burr, and further surface working, in particular in the region of the finger holes, may be dispensed with.

These and other objects and advantages of the invention will be more clearly understood from a detailed description of the preferred embodiments set forth below.

SUMMARY OF THE INVENTION

Shears made of steel sheet cuts, the cuts being stamped portions of integral construction comprising a cutting edge, a stem and a finger hole, the stamped portion being of a "V" or like configuration, the finger hole including a small gap.

BRIEF DESCRIPTION OF THE DRAWINGS

FIG. 1 shows shears in elevation;
FIG. 2 shows a side elevation according to FIG. 1;
FIG. 3 shows a sheet cut for the first half of the shears; and
FIG. 4 shows a sheet cut for the second half of the shears.

DESCRIPTION OF THE PREFERRED EMBODIMENTS

The embodiments shown in the drawing illustrate bent household or cutter shears, which are formed from two cut sheets, i.e. stamped parts, according to FIGS. 3 and 4 and consist of a so-called upper shear 5 and a so-called lower shear 6, as well as of a conventional shears pin 7. The two shears 5 and 6 comprise cutting edge limbs 51 and 61, stems 52 and 62, and finger holes 53 and 63.

In the production of the shears, initially stamped parts 8 and 9 are cut from a steel sheet panel with small loss of material, and, as is evident from FIGS. 3 and 4, consist in each case of two limbs at an angle to one another. A main limb 81 of the stamped part 8 forms the cutting limb 51 of the shears, and a side limb 82 after its bending-over forms the finger hole 53. Similarly, the limbs 91 and 92 form the cutting edge limb 61 and the hole 63 of the second half of the shears respectively. The stamping blanks are then descaled, if bright-rolled steel is not employed, and freed from stamping burr at their peripheral edges. Subsequently, the limbs 82 and 92 are bent over and turned around by a substantially right angle by means of suitable bending devices into the final shape of the finger holes 53 and 63 evident from FIGS. 1 and 2, and the halves of the shears are put together.

By the sine-like shaping of the limbs 82 and 92, the finished bent holes 53 and 63 receive a parallelogram-like outline, seen in side elevation of the shears, the hole 63 of the lower shear 6 pointing away from the cutting edge limb 61. The hole 53 is inclined to the longitudinal direction of the shears, and forms an obtuse angle with the associated cutting edge limb 51, enabling the thumb of the operating hand to find full contact. After the deformation, the free ends of the limbs 82 and 92 form in each case a gap 53' and 63', interrupting the ring periphery of the holes 53 and 63, in that they are not brought up fully against counter webs 83 and 93. It is, however, also possible to bring these end regions completely against one another, and to connect them together.

The invention is not restricted to the shown embodiment. Rather, a series of possibilities of modifications are available relating to the form and the shaping of the cutting edge limbs and of the finger holes, as well as to the purpose of application. The production of the halves of the shears from steel sheet and the shaping of the finger holes by bending-over of strip-like extensions at the respective ends of the halves of the shears are regarded as principal features.

The above described shears may be made in a simple and economical manner, and have a particularly good handiness and pleasing shape.

Although only the basic concept directed to specific structure of the present invention have been set forth herein, embellishments thereof are considered to be encompassed and lie within the spirit and scope of the invention as claimed.

I claim:

1. A method of making shears having a first and a second shear comprising the steps of:

A. cutting from steel sheet two integral parts each of substantially two arms-shape, the arms being disposed in an angle to one another, such that the first arm includes a cutting edge and a stem, and the second arm has a slight S-configuration and a strap projecting from the arms junction, B. a. a first bending step for bending the second arm of each part along with the strap to form substantially a ring structure, the ends of the arm and strap substantially abutting, b. a second bending step for bending said ring structure angularly out of its plane, and C. joining the first and second shears by a shear pin traversing both shears.

2. The method as claimed in claim 1 wherein said first bending step is performed such that said ring structure is of circular configuration.

3. The method as claimed in claim 1 wherein said first bending step is performed such that said ring structure is of oval configuration.

4. The method as claimed in claim 1 wherein said second bending step is performed such that the ring structure is bent out of its plane by an angle of less than 90°.

5. The method as claimed in claim 1 wherein said second bending step is performed such that the ring structure is bent out of its plane by an angle exceeding 90°.

6. The method as claimed in claim 1 wherein the two arms-shape is formed in a V configuration.

7. The method as claimed in claim 1 wherein the two arms-shape is formed in an L configuration.

8. The method as claimed in claim 1 wherein the two arms-shape is formed in a T configuration.

9. The method as claimed in claim 1 comprising the steps of providing a gap in the ring structure.

10. The method as claimed in claim 1 wherein said bending steps are performed such that the ring structures have, in side elevation, parallelogramlike configurations, each inclining in a direction different from the other.

11. The method as claimed in claim 1 wherein said bending steps are performed such that the ring structure is disposed obliquely to the longitudinal direction of the shears forming an obtuse angle with the associated cutting edge.

* * * * *